(12) United States Patent
Qi

(10) Patent No.: US 11,902,909 B2
(45) Date of Patent: Feb. 13, 2024

(54) APPARATUS AND METHOD FOR REFERENCE SIGNAL POWER BOOSTING IN A WIRELESS COMMUNICATION SYSTEM

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/461,594

(22) Filed: Aug. 30, 2021

(65) Prior Publication Data
US 2021/0400598 A1     Dec. 23, 2021

Related U.S. Application Data

(63) Continuation of application No. 16/368,244, filed on Mar. 28, 2019, now Pat. No. 11,109,325.

(30) Foreign Application Priority Data

Mar. 28, 2018 (GB) .................................. 1805051

(51) Int. Cl.
    *H04W 4/00*     (2018.01)
    *H04W 52/32*     (2009.01)
    (Continued)

(52) U.S. Cl.
    CPC ........ *H04W 52/325* (2013.01); *H04B 7/0456* (2013.01); *H04L 5/0048* (2013.01)

(58) Field of Classification Search
CPC .. H04B 7/0456; H04B 7/0478; H04B 7/0691; H04L 5/0048; H04L 5/005;
(Continued)

(56) References Cited

U.S. PATENT DOCUMENTS

| | | | |
|---|---|---|---|
| 9,544,111 | B2 | 1/2017 | Noh |
| 10,230,512 | B2 | 3/2019 | Hessler et al. |

(Continued)

FOREIGN PATENT DOCUMENTS

| | | | |
|---|---|---|---|
| CN | 102067685 A | 5/2011 | |
| CN | 102714527 A | 10/2012 | |

(Continued)

OTHER PUBLICATIONS

3GPP TS 38.214 V15.0.0, 3rd Generation Partnership Project; Technical Specification Group Radio Access Network; NR; Physical layer procedures for data (Release 15), Technical Specification, 71 pages, Dec. 17, 2017.*

(Continued)

*Primary Examiner* — Frank Duong

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). According to an embodiment of the disclosure, a method for operating a user equipment (UE) in a wireless communication system includes determining power of at least one phase tracking reference signal (PT-RS), and transmitting the at least one PT-RS according to non-codebook based transmission. Herein, the power is determined based on a number of at least one port for the at least one PT-RS.

8 Claims, 6 Drawing Sheets

(51) Int. Cl.
  *H04B 7/0456* (2017.01)
  *H04L 5/00* (2006.01)
(58) Field of Classification Search
  CPC ... H04W 52/146; H04W 52/16; H04W 52/32; H04W 52/325; H04W 52/34; H04W 52/346; H04W 52/367; H04W 72/04; H04W 72/0413; H04W 72/0473
  See application file for complete search history.

(56) References Cited

U.S. PATENT DOCUMENTS

| | | | |
|---|---|---|---|
| 10,355,842 | B2 | 7/2019 | Lee et al. |
| 10,461,907 | B2 | 10/2019 | Lee et al. |
| 10,560,243 | B2 | 2/2020 | Bai et al. |
| 10,594,382 | B2 | 3/2020 | Zhang et al. |
| 10,644,855 | B2* | 5/2020 | Lee ............... H04W 72/0473 |
| 10,785,005 | B2 | 9/2020 | Lee et al. |
| 10,805,052 | B2 | 10/2020 | Cases et al. |
| 10,868,607 | B2 | 12/2020 | Zhang et al. |
| 10,972,238 | B2 | 4/2021 | Zhang et al. |
| 10,999,031 | B2* | 5/2021 | Lee ............... H04W 72/0473 |
| 2012/0250608 | A1 | 10/2012 | Wang et al. |
| 2014/0086285 | A1 | 3/2014 | Yang et al. |
| 2014/0105320 | A1 | 4/2014 | Wang et al. |
| 2018/0070316 | A1 | 3/2018 | Sun et al. |
| 2018/0368013 | A1 | 12/2018 | Yoo et al. |
| 2019/0140729 | A1* | 5/2019 | Zhang ............... H04W 52/16 |
| 2019/0149299 | A1 | 5/2019 | Lee et al. |
| 2020/0186226 | A1* | 6/2020 | Zhang ............... H04L 1/0004 |

FOREIGN PATENT DOCUMENTS

| | | | |
|---|---|---|---|
| CN | 102792610 | A | 11/2012 |
| CN | 105745975 | A | 7/2016 |
| CN | 107438955 | A | 12/2017 |
| KR | 20130050267 | A | 5/2013 |
| KR | 20140018786 | A | 2/2014 |
| KR | 20180022071 | A | 3/2018 |
| WO | 2017069580 | A1 | 4/2017 |

OTHER PUBLICATIONS

3GPP TS 38.214 V15.2.0, 3rd Generation Partnership Project; Technical Specification Group Radio Access Network; NR; Physical layer procedures for data (Release 15), Technical Specification, 98 pages, Jun. 2018.*

3GPP TS 38.214 V15.1.0, 3rd Generation Partnership Project; Technical Specification Group Radio Access Network; NR; Physical layer procedures for data (Release 15), Technical Specification, 81 pages, Mar. 2018.*

Intellectual Property India, "Examination report under sections 12 & 13 of the Patents Act" dated Dec. 8, 2021, in connection with Indian Patent Application No. 202017046961, 6 pages.

European Patent Office, "Communication pursuant to Article 94(3) EPC" dated Dec. 23, 2021, in connection with European Patent Application No. 19774418.8, 6 pages.

LG Electronics, "Text proposals on UL PT-RS power boosting" 3GPP TSG RAN WG1 Meeting #92, R1-1802201, Athens, Greece, Feb. 26-Mar. 2, 2018, 5 pages.

ZTE, Sanechips, "Remaining Details on PT-RS", 3GPP TSG RAN WG1 Meeting #91, Nov. 27 to Dec. 1, 2017, 8 pages, R1-1719543.

ZTE, "Remaining issues on PT-RS", 3GPP TSG RAN WG1 Meeting #93, May 21-25, 2018, 2 pages, R1-1805833.

Ericsson, "Remaining issues on PT-RS", 3GPP TSG RAN WG1 Meeting #93, May 21-25, 2018, 6 pages, R1-1806226.

Intel Corporation, "Remaining Issues on PT-RS", 3GPP TSG RAN WG1 Meeting #93, May 21-25, 2018, 3 pages, R1-1806512.

Samsung, "Issues on PT-RS Design", 3GPP TSG RAN WG1 Meeting #93, May 21-25, 2018, 3 pages, R1-1806724.

Qualcomm Incorporated, "PT-RS Considerations", 3GPP TSG RAN WG1 Meeting #93, May 21-25, 2018, 5 pages, R1-1807348.

NTT DoCoMo, Inc., "New WID on New Radio Access Technology", 3GPP TSG RAN Meeting #75, Mar. 6-9, 2017, 8 pages, RP-170847.

"3rd Generation Partnership Project; Technical Specification Group Radio Access Network; NR; Physical layer procedures for data (Release 15)", 3GPP TS 38.214 v15.4.0, Dec. 2018, 102 pages.

"3rd Generation Partnership Project; Technical Specification Group Radio Access Network; Study on New Radio (NR) access technology (Release 15)", 3GPP TR 38.912 v15.0.0, Jun. 2018, 74 pages.

"3rd Generation Partnership Project; Technical Specification Group Radio Access Network; NR; Physical channels and modulation (Release 15)", 3GPP TS 38.211 v15.4.0, Dec. 2018, 96 pages.

Combined Search and Examination Report under Sections 17 and 18(3) dated Sep. 19, 2018 in connection with United Kingdom Patent Application No. GB1805051.8, 6 pages.

Intel Corporation, "On Non-Codebook Based UL Transmission", 3GPP TSG RAN WG1 Meeting #92, Feb. 26-Mar. 2, 2018, 5 pages, R1-1802392.

LG Electronics et al., "WF on UL PT-RS power boosting factor", 3GPP TSG RAN WG1 Meeting #92, Feb. 26-30, 2018, 3 pages, R1-1803427.

Ericsson, "Summary of PTRS open issues", 3GPP TSG RAN WG1 Meeting #91, Nov. 27-Dec. 1, 2017, 9 pages, R1-1721441.

International Search Report dated Jul. 9, 2019 in connection with International Patent Application No. PCT/KR2019/003662, 3 pages.

Written Opinion of the International Searching Authority dated Jul. 9, 2019 in connection with International Patent Application No. PCT/KR2019/003662, 4 pages.

Ericsson, "Summary of PTRS open issues", 3GPP TSG RAN WG1 Meeting #91, Nov. 27-Dec. 1, 2017, RI-1721441, 9 pages.

Nokia et al., "On remaining details on PT-RS design", 3GPP TSG RAN WG1 #91, Nov. 27-Dec. 1, 2017, R1-1720896, 5 pages.

Ericsson, "Text Proposals for TS38.214 related to PT-RS", 3GPP TSG RAN WG1 Meeting #92, Feb. 26-30, 2018, R1-1803453, 3 pages.

Ericsson, "Feature lead summary 3 of PT-RS", 3GPP TSG RAN WG1 Meeting #92, R1-1803384, 12 pages.

Intel Corporation, "On Non-Codebook Based UL Transmission", 3GPP TSG RAN WG1 Meeting #92, Feb. 26-Mar. 2, 2018, R1-1802392, 5 pages.

LG Electronics et al., "WF on UL PT-RS power boosting factor", 3GPP TSG RAN WG1 Meeting #92, Feb. 26-30, 2018, R1-1803427, 3 pages.

Supplementary European Search Report dated Mar. 30, 2021 in connection with European Patent Application No. 19 77 4418, 13 pages.

LG Electronics, "Text proposals on UL PT-RS power boosting and DL PT-RS reception", 3GPP TSG RAN WG1 Meeting AH 1801, R1-1800369, Jan. 2018, 8 pages.

Intel Corporation, "Remaining Issues on PT-RS", 3GPP TSG RAN WG1 Meeting AH 1801, R1-1800317, Jan. 2018, 9 pages.

CATT, "Remaining issues on PT-RS", 3GPP TSG RAN WG1 Meeting AH 1801, R1-1800246, Jan. 2018, 5 pages.

"WF on PT-RS power boosting", 3GPP TSG RAN WG1 Meeting RAN#91, R1-1721517, Dec. 2017, 7 pages.

Qi et al., "On the Phase Tracking Reference Signal (PT-RS) Design for 5G New Radio (NR)", IEEE, 2018, 5 pages.

European Patent Office, "Communication pursuant to Article 94(3) EPC" dated Feb. 28, 2023, in connection with European Patent Application No. 19774418.8, 5 pages.

Office Action dated Sep. 26, 2023, in connection with Chinese Patent Application No. 201980019850.7, 32 pages.

Office Action dated Dec. 15, 2023, in connection with Indian Patent Application No. 202017046961, 3 pages.

* cited by examiner

Muted REs for PTRS

APPARATUS AND METHOD FOR REFERENCE SIGNAL POWER BOOSTING IN A WIRELESS COMMUNICATION SYSTEM

CROSS-REFERENCE TO RELATED APPLICATION AND PRIORITY CLAIM

This application is a continuation of U.S. patent application Ser. No. 16/368,244 filed on Mar. 28, 2019, which is based on and claims priority under 35 U.S.C. § 119 to United Kingdom Patent Application No. 1805051.8 filed on Mar. 28, 2018, the disclosures of which are herein incorporated by reference in their entirety.

BACKGROUND

1. Field

The disclosure relates to a wireless communication system. More particularly, the disclosure relates to an apparatus and a method for boosting power of reference signals in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In 5G new radio (NR) systems, the power of the phase tracking reference signal (PTRS) may be used to address common phase error (CPE). Herein, the PTRS may be boosted to improve CPE accuracy. Power boosting for PTRS in codebook-based UL transmission has been agreed in standardization meetings.

SUMMARY

According to the disclosure there is provided an apparatus and method as set forth in the appended claims. Other features of the disclosure will be apparent from the dependent claims, and the description which follows.

According to an embodiment of the disclosure, a method for operating a user equipment (UE) in a wireless communication system is provided. The method includes determining power of at least one phase tracking reference signal (PT-RS), and transmitting the at least one PT-RS according to non-codebook based transmission. Herein, the power is determined based on a number of at least one port for the at least one PT-RS.

According to an embodiment of the disclosure, A UE in a wireless communication system is provided. The UE includes a transceiver, and at least one processor coupled to the transceiver. The at least one processor is configured to determine power of at least one PT-RS, and transmit the at least one PT-RS according to non-codebook based transmission. Herein, the power is determined based on a number of at least one port for the at least one PT-RS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

The disclosure relates to boosting power of certain reference signals in a wireless communication system. It relates particularly, but not exclusively to a 5$^{th}$ generation (5G) or new radio (NR) system, although other systems may benefit. Further it relates particularly to the phase tracking reference Signal (PTRS or PT-RS), although other reference signals may benefit. Further, it relates particularly to non-codebook-based uplink (UL) transmissions.

Terms indicating signals, terms indicating signal propagation characteristics (e.g., directivity), terms indicating control information, terms indicating network entities, and terms indicating components of a device, which are used in the following descriptions, are for the sake of explanations. Accordingly, the disclosure is not limited to the terms to be described, and may use other terms having technically identical or similar meaning.

In this disclosure, to determine whether a specific condition is satisfied or fulfilled, expressions such as "greater than" or "less than" are used by way of example and expressions such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versal), etc.

Figure 1:
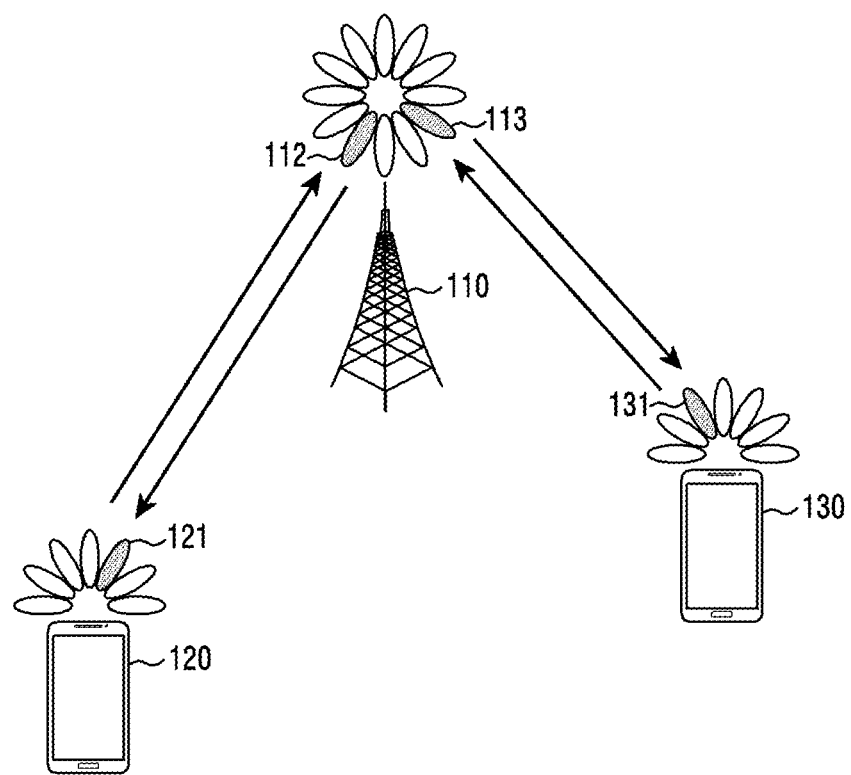
FIG. 1 illustrates a wireless communication system according to an embodiment of the disclosure.

FIG. 1 illustrates a wireless communication system according to an embodiment. FIG. 1 depicts a base station 110, a terminal 120, and a terminal 130 as some of nodes that use a radio channel in the wireless communication system. While FIG. 1 depicts a single base station, another base station that is the same as or similar to the base station 110 may be further included.

The base station 110 is a network infrastructure that provides radio access to the terminals 120 and 130. The base station 110 has coverage defined as a geographical area based on a signal transmission distance. The base station 110 may be referred to as an access point (AP), an eNodeB (eNB), a 5th generation node (5G node), a next generation nodeB (gNB), a wireless point, a transmission/reception point (TRP), or other terms having a technically equivalent meaning.

The terminal 120 and the terminal 130 are each used by a user and communicate with the base station 110 over a radio (or wireless) channel. In some cases, at least one of the terminal 120 and the terminal 130 may operate without a user's involvement. That is, at least one of the terminal 120 and the terminal 130 may perform machine type communication (MTC) and may not be carried by the user. The terminal 120 and the terminal 130 each may be referred to as a user equipment (UE), a mobile station, a subscriber station, a remote terminal, a wireless terminal, a user device, or other terms having a technically equivalent meaning.

The base station 110, the terminal 120, and the terminal 130 may transmit and receive radio signals (e.g., wireless signals) in a millimeter wave (mmWave) band (e.g., 28 GHz, 30 GHz, 38 GHz, 60 GHz). To improve channel gain, the base station 110, the terminal 120, and the terminal 130 may conduct (or perform) beamforming. Herein, the beamforming may include transmit beamforming (or transmission beamforming) and receive beamforming (or reception beamforming). That is, the base station 110, the terminal 120, and the terminal 130 may apply directivity to a transmit signal or a receive signal. To this end, the base station 110 and the terminals 120 and 130 may select serving beams 112, 113, 121, and 131 through a beam search or beam management procedure. After the serving beams 112, 113, 121, and 131 are selected, communications may be performed using resources that are quasi co-located (QCL) with resources used for transmitting the serving beams 112, 113, 121, and 131.

If large-scale properties of a channel that carries a symbol on a first antenna port may be inferred from a channel that carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

Figure 2:
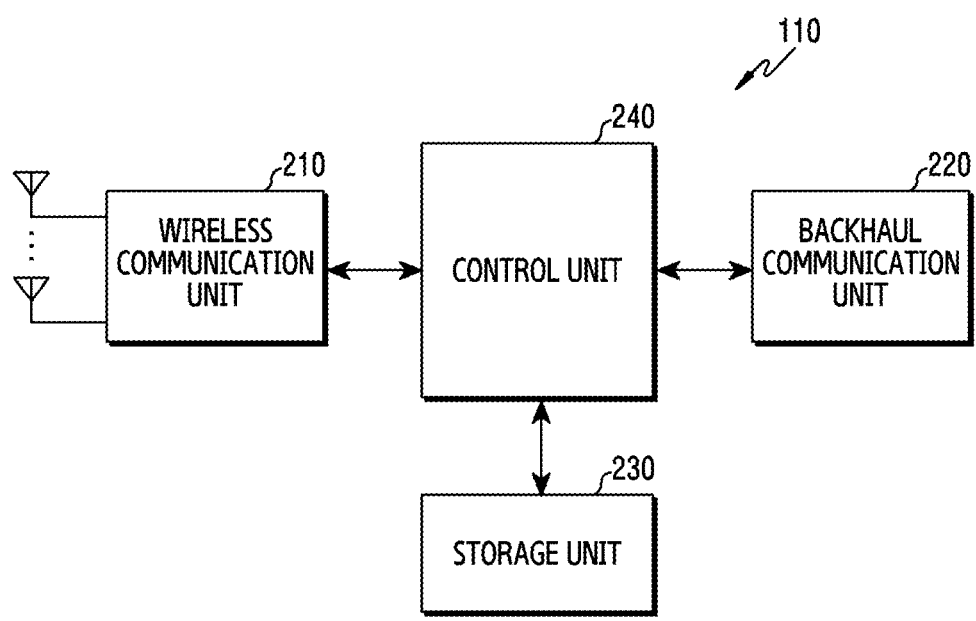
FIG. 2 illustrates a base station in a wireless communication system according to an embodiment of the disclosure.

FIG. 2 illustrates a base station 110 in a wireless communication system according to an embodiment. FIG. 2 depicts a configuration of the base station 110. In the following description, it is understood that a term such as "module", "unit", "portion", "-or" or "-er" indicates a unit for processing at least one function or operation, and may be implemented using hardware, software, or a combination of hardware and software.

Referring to FIG. 2, the base station 110 includes a wireless communication unit 210 (e.g., wireless communicator or wireless communication interface), a backhaul communication unit 220 (e.g., backhaul communicator or backhaul communication interface), a storage unit 230 (e.g., storage), and a control unit 240 (e.g., at least one processing device).

The wireless communication unit 210 may transmit and receive signals over a radio (or wireless) channel. For example, the wireless communication unit 210 performs a conversion function between a baseband signal and a bit string (or bit stream) according to a physical layer standard of the system. By way of further example, when data is transmitted, the wireless communication unit 210 generates complex symbols by encoding and modulating a transmit bit string (or transmission bit stream). Similarly, when data is received, the wireless communication unit 210 restores a receive bit string (or reception bit stream) by demodulating and decoding a baseband signal.

Furthermore, the wireless communication unit 210 up-converts the baseband signal to a radio frequency (RF) band signal, transmits the RF band signal via an antenna, and down-converts an RF band signal received via an antenna to a baseband signal. To this end, the wireless communication unit 210 may include at least one of a transmit filter, a receive filter, an amplifier, a mixer, an oscillator, a digital to analog convertor (DAC), an analog to digital convertor (ADC), and the like. In addition, the wireless communication unit 210 may include or utilize a plurality of transmit (or transmission) and receive (or reception) paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As described above, the wireless communication unit 210 transmits and receives signals. Hence, the entirety or a part of the wireless communication unit 210 may be referred to as a transmitter, a receiver, or a transceiver. Hereinbelow, transmission and the reception over a radio (or wireless) channel may include the above-described processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string.

The storage unit 230 stores data, such as a basic program, an application program, configuration information, settings, and the like for operating the base station. The storage unit 230 may include a volatile memory, a non-volatile memory, or a combination of a volatile memory and a non-volatile memory. The storage unit 230 provides the stored data in response to a request from the control unit 240.

The control unit 240 controls general operations of the base station. For example, the control unit 240 transmits and receives signals through the wireless communication unit 210 or the backhaul communication unit 220. Also, the control unit 240 records data to the storage unit 230 and reads data from the storage unit 230. The control unit 240 may execute functions of a protocol stack required by or included in a particular communication standard. According to another embodiment, the protocol stack may be included in and/or implemented via the wireless communication unit 210. To this end, the control unit 240 may include at least one processor.

According to an embodiment, the control unit 240 may determine at least one beam to communicate with a terminal (e.g., the terminal 120). For example, the control unit 240 may determine a transmit (or transmission) beam of the base station 110 based on a feedback from the terminal. Further, the control unit 240 may determine at least one of a receive (or reception) beam of the base station 110 and a transmit beam of the terminal using a signal transmitted from the terminal. Additionally, the control unit 240 may transmit information indicating the determined transmit beam of the terminal, to the terminal. For example, the control unit 240 may control the base station 110 to carry out operations explained below according to one or more embodiments.

Figure 3:
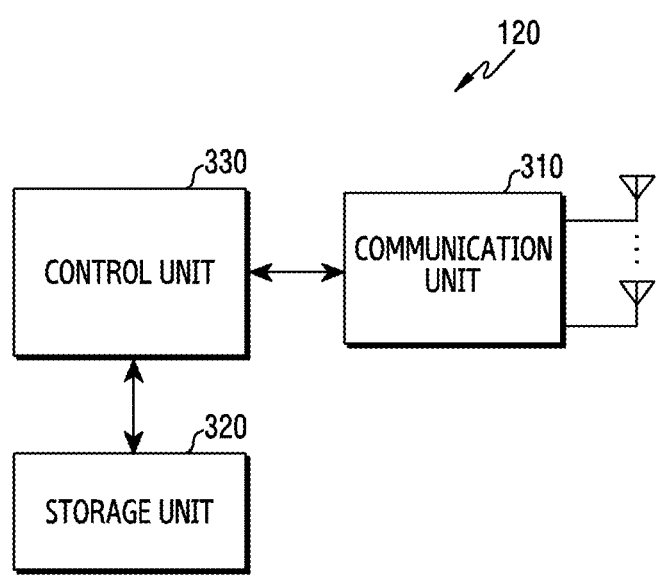
FIG. 3 illustrates a terminal in a wireless communication system according to an embodiment of the disclosure.

FIG. 3 illustrates a terminal 120 in a wireless communication system according to an embodiment. In the following description, it is understood that a term such as "module", "unit", "portion", "-or" or "-er" indicates a unit for processing at least one function or operation, and may be implemented using hardware, software, or a combination of hardware and software.

Referring to FIG. 3, the terminal 120 includes a communication unit 310 (e.g., communicator or communication interface), a storage unit 320 (e.g., storage), and a control unit 330 (e.g., at least one processor). By way of example, the terminal 120 may be a cellular phone or other device that communicates over a cellular network (such as a 5G or pre-5G network).

The communication unit 310 may transmit and receive signals over a radio channel. For example, the communication unit 310 performs a conversion function between a baseband signal and a bit string according to a physical layer standard of the system. By way of further example, when data is transmitted, the communication unit 310 generates complex symbols by encoding and modulating a transmit bit string. Similarly, when data is received, the communication unit 310 restores a receive bit string by demodulating and decoding a baseband signal. Furthermore, the communication unit 310 up-converts the baseband signal to an RF band signal, transmits the RF band signal via an antenna, and down-converts an RF band signal received via the antenna to a baseband signal. For example, the communication unit 310 may include at least one of a transmit filter, a receive filter, an amplifier, a mixer, an oscillator, a DAC, an ADC, and the like.

Also, the communication unit 310 may include or utilize a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As described above, the communication unit 310 transmits and receives signals. Hence, the entirety or a part of the communication unit 310 may be referred to as a transmitter, a receiver, or a transceiver. Hereinbelow, the transmission and the reception over the radio channel may include the above-described processing of the communication unit 310.

The storage unit 320 stores data, such as a basic program, an application program, configuration information, settings, and the like for operating the terminal. The storage unit 320 may include a volatile memory, a non-volatile memory, or a combination of a volatile memory and a non-volatile memory. The storage unit 320 provides the stored data according to a request from the control unit 330.

The control unit 330 controls general operations of the terminal. For example, the control unit 330 transmits and receives signals through the communication unit 310. Also, the control unit 330 records data to the storage unit 320 and reads data from the storage unit 320. The control unit 330 may execute functions of a protocol stack required by or included in a particular communication standard. To this end, the control unit 330 may include at least one processor or microprocessor, or may be part of a processor. Part of the communication unit 310 and the control unit 330 may be referred to as a communication processor (CP).

According to an embodiment, the control unit 330 may determine at least one beam for communication with a base station (e.g., the base station 110). For example, the control unit 330 may determine at least one of a receive beam of the terminal 120 and a transmit beam of the base station using a signal transmitted from the base station. Further, the control unit 330 may transmit information indicating the determined transmit beam of the base station, to the base station. For example, the control unit 330 may determine the transmit beam of the base station based on a request from the base station. Further, the control unit 330 may control the terminal to carry out operations, to be explained below, according to one or more embodiments.

In the wireless communication system according to an embodiment, a base station or a terminal may transmit PTRSs. An agreement about power of the PTRS in standardization meetings may be summarized by means of the following table 1 below.

TABLE 1

| UL-PTRS-power/ | Full coherent $n_{layer}^{PUSCH}$ | | | | Partial coherent $n_{layer}^{PUSCH}$ | | | | Non-coherent $n_{layer}^{PUSCH}$ | | | |
|---|---|---|---|---|---|---|---|---|---|---|---|---|
| | 1 | 2 | 3 | 4 | 1 | 2 | 3 | 4 | 1 | 2 | 3 | 4 |
| 00 | 0 | 3 | 4.77 | 6 | 0 | Q | Q | Q+3 | 0 | Q | Q | Q |
| 01 | 0 | 3 | 4.77 | 6 | 0 | 3 | 4.77 | 6 | 0 | 3 | 4.77 | 6 |
| 10 | reserved | | | | reserved | | | | reserved | | | |
| 11 | Reserved | | | | reserved | | | | reserved | | | |

Note
that: Q = 0 for 1 PT-RS port case, Q = 3 for 2 PT-RS port case.

If two PT-RS ports are configured, their energy per resource element (EPREs) are the same. However, for cases where non-codebook-based UL transmissions are made, there is no agreed standardized approach. Embodiments of the disclosure aim to address issues related to reference signal boosting in non-codebook-based UL transmissions.

For codebook-based UL transmissions, there may be a constraint on per antenna/antenna-port power constraint because the RF chain cost is higher without such a constraint and power boosting may be adjusted to include such a constraint.

For codebook-based (as opposed to non-codebook-based) UL transmission, it is known exactly whether the transmission is coherent, partially-coherent or non-coherent. For coherent transmission, there is only one RF chain and the power source is shared by all UL transmission layers.

Figure 4:
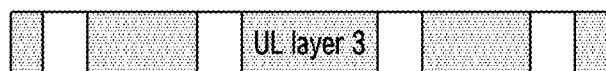
FIG. 4 illustrates a representation of phase tracking reference signal (PTRS) power boosting for coherent UL transmission according to an embodiment of the disclosure.
Figure 4:
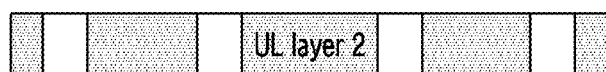
Figure 4:
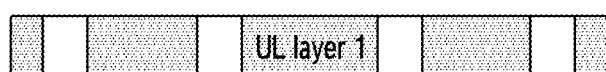
Figure 4:
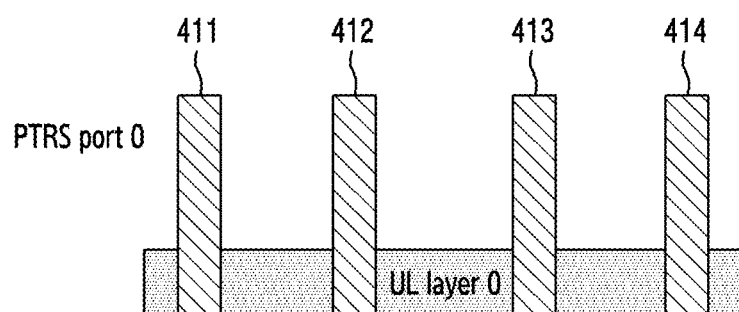

Therefore, such a power constraint does not apply, as illustrated in FIG. 4, where single PTRS port 0 is boosted by 4 times (6 dB), as shown by the enlarged shaded portions 411-414. On the contrary, for partial or non-coherent cases, there may be multiple RF chains and power sources. FIG. 4 illustrates a fully coherent scenario, with four UL layers. Each layer corresponds to a separate data stream, having its own DMRS port.

Figure 5:
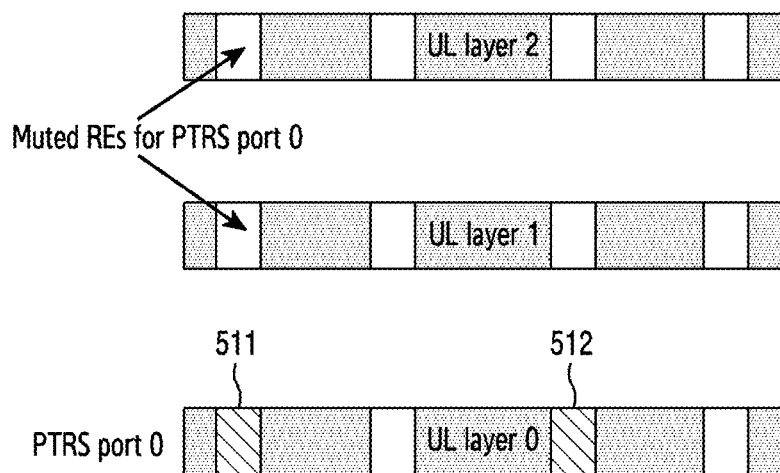
FIG. 5 illustrates a representation of PTRS power boosting for partially coherent UL transmission according to an embodiment of the disclosure.

For instance, four UL transmission layers could be divided into multiple groups and each group has its own RF chain and power source so that any power sharing is only possible within each group. In such a case, power constraint applies and the power boosting can be performed based on the first row (00) of Table 1. This is illustrated in FIG. 5, where a single PTRS port is configured but its power is not boosted because of the per antenna/antenna-port power constraint. FIG. 5 illustrates a partially coherent scenario, where the shaded portions 511 and 512 represent REs where PTRS is transmitted but power boosting is not permitted.

An issue for the current codebook-based UL transmission power boosting concerns the second row (01) of Table 1. For the first row (00), the number of PTRS ports can be configured as one or two. However, for the second row (01), there are some issues. In such a case, it should be configured such that the second row can only be configured when one PTRS port is configured, i.e., simultaneous configuration of 2 PTRS ports and UL-PTRS-power="01" should be forbidden.

Embodiments of the disclosure address the power boosting problem for non-codebook based UL transmission. For non-codebook based transmission, the base station (gNB) may not be able to ascertain how precoding is performed by the UE and so therefore does not know if power constraints apply or not. In such a case, the worst case may be assumed, where there might be multiple power sources and they cannot be shared. The power boosting factor needs to be signaled via RRC.

In one embodiment, power can be borrowed from other UL layers where the corresponding DMRS ports share the same PTRS port.

When only one PTRS port is configured, power boosting may be based on the number of UL transmission layers, i.e., number of corresponding UL DMRS ports sharing the indicated UL PTRS port, which is essentially the same as is illustrated in FIG. 4.

When two PTRS ports are configured, there may be only one RF chain so that the power source can be shared. However, it is also possible that there are two RF chains, so that power sharing is not possible.

Figure 6:
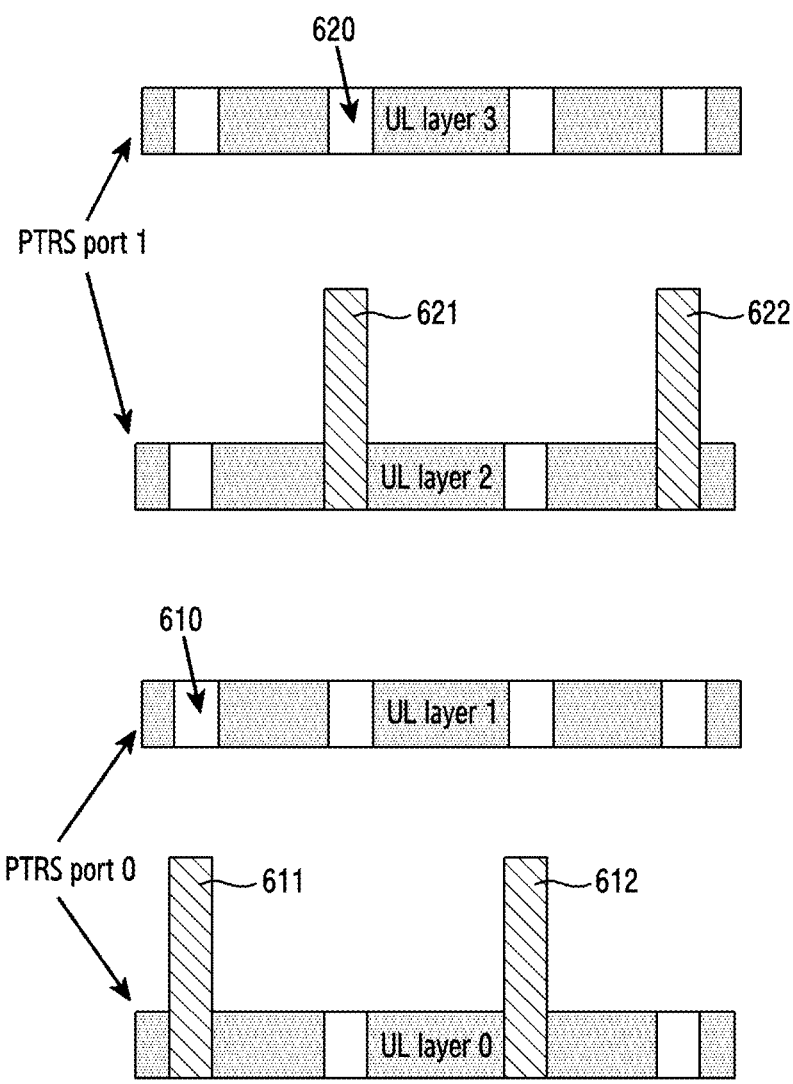
FIG. 6 illustrates a representation of PTRS power boosting for non-codebook-based UL transmission according to an embodiment of the disclosure.

The gNB does not have such information. As mentioned above, the worst case needs to be considered in such a case, i.e., power sharing is not possible. As such, power boosting can be from two sources:

Muted REs from another PTRS port
Muted REs from other UL transmission layers where the corresponding UL DMRS ports share the same UL PTRS port As illustrated in FIG. 6, two PTRS ports are configured. DMRS ports corresponding to UE layer 0 and 1 share PTRS port 0 and DMRS ports corresponding to UE layer 2 and 3 share PTRS port 1.

Both PTRS port 0 and 1 can be power boosted due to the muted REs configured for the other PTRS port, i.e., port 0 can be boosted due to the muted REs configured for port 1 and vice-versa.

In addition, it is possible to boost the power further due to the muted REs from another UE layer where the corresponding DMRS ports share the same PTRS port.

In FIG. 6, PTRS port 0 is power boosted by a factor of 2 (3 dB), because of the muted REs for PTRS port 1 and is further boosted by a factor of 2 (3 dB), giving a total of 6 dB because of the muted REs 610 for UL layer 1. The power boost is represented by the shaded taller bars 611 and 612.

Port 1 is power boosted by a factor of 2 (3 dB), because of the muted REs for PTRS port 0 and is further boosted by a factor of 2 (3 dB), giving a total of 6 dB because of the muted REs 620 for UL layer 3. The power boost is represented by the shaded taller bars 621 and 622.

The power boosting $\rho_{PTRS,i}$ for PTRS port i can be expressed as:

$$\rho_{PTRS,i} = -10 \log_{10}(N_{PTRS}) - \alpha_{PTRS,i},$$

where $N_{PTRS}$ is the number of total PTRS ports, and $\alpha_{PTRS,i}$ is shown in Table 2 below which is to be reflected in the standardization protocols for NR.

TABLE 2

| PUSCH-to-PT-RS EPRE ratio | The number of PUSCH layers where the corresponding DMRS ports share the same PT-RS port i, ($n_{layer}^{PUSCH}$) | | | |
|---|---|---|---|---|
| | 1 | 2 | 3 | 4 |
| 00 | 0 | 3 | 4.77 | 6 |
| 01 | | | reserved | |
| 10 | | | reserved | |
| 11 | | | reserved | |

It should be noted that one PTRS port can be associated with one sounding reference signal (SRS) port. One or multiple DMRS port(s) can be associated with the SRS port. In such a case, it is possible to use the number of DMRS ports associated with the SRS ports, where the PTRS port index associated with different scheduling request indicator (SRIs) are the same. In such a case, $n_{layer}^{PUSCH}$ can also be equal to the number of DMRS ports associated with the SRS ports, where the PTRS port index associated with different SRIs are the same.

In the case of coherence, Table 2 can be modified to give Table 3, below:

TABLE 3

| PUSCH-to-PT-RS EPRE ratio | The number of PUSCH layers where the corresponding DMRS ports share the same PT-RS port i, ($n_{coherentlayer}^{PUSCH}$) | | | |
|---|---|---|---|---|
| | 1 | 2 | 3 | 4 |
| 00 | 0 | 3 | 4.77 | 6 |
| 01 | | | reserved | |
| 10 | | | reserved | |
| 11 | | | reserved | | where $n_{coherentlayer}^{PUSCH}$ is the number of coherent PUSCH layers whose corresponding DMRS ports share the same PTRS port and is equal to or smaller than $n_{layer}^{PUSCH}$.

In another embodiment, the power boosting factor $\rho_{PTRS,i}$ can be a fixed value so that $$\rho_{PTRS,i} = -10 \log_{10}(N_{PTRS})$$

if $\alpha_{PTRS,i}$ is set as 0.

Power boosting is then only decided by number of configured PTRS ports.

Alternatively, the following equation may apply:

$$\rho_{PTRS,i} = -10 \log_{10}(N_{PTRS}) - \alpha_{PTRS,i}$$

This leads to Table 4, below:

TABLE 4

| PUSCH-to-PT-RS EPRE ratio | The number of PUSCH layers where the corresponding DMRS ports share the same PT-RS port i, ($n_{layer}^{PUSCH}$) | | | |
|---|---|---|---|---|
| | 1 | 2 | 3 | 4 |
| 00 | α | α | α | α |
| 01 | | | reserved | |

TABLE 4-continued

| PUSCH-to-PT-RS EPRE ratio | The number of PUSCH layers where the corresponding DMRS ports share the same PT-RS port i, ($n_{layer}^{PUSCH}$) | | | |
|---|---|---|---|---|
| | 1 | 2 | 3 | 4 |
| 10 | | | reserved | |
| 11 | | | reserved | | where α can be any constant value.

For codebook-based transmission, a UE reports its UE capability as one of: 'partialAndNonCoherent'; 'Non-Coherent'; or 'fullAndPartialAndNonCoherent'. For non-codebook-based transmission, according to an embodiment of the disclosure, this reporting information can also be used.

If the UE reports 'Non-Coherent' or does not report, it can be assumed that the UE can only work for non-coherent case and therefore, the power boosting factor can be shown to be:

$$\rho_{PTRS,i} = -10 \log_{10}(N_{PTRS})$$

If the UE reports 'fullAndPartialAndNonCoherent', only one PTRS port can be configured, based on the agreement, and the power boosting factor is given as:

$$\rho_{PTRS,i} = -\alpha_{PTRS,i}$$

The following table, Table 5, then applies:

TABLE 5

| PUSCH-to-PT-RS EPRE ratio | The number of PUSCH layers where the corresponding DMRS ports share the same PT-RS port i, ($n_{layer}^{PUSCH}$) | | | |
|---|---|---|---|---|
| | 1 | 2 | 3 | 4 |
| 00 | 0 | 3 | 4.77 | 6 |
| 01 | | | reserved | |
| 10 | | | reserved | |
| 11 | | | reserved | |

If the UE reports 'partialAndNonCoherent', the UE can work either in non-coherent mode or partial-coherent mode. Table 6, below, then applies:

TABLE 6

| UL-PTRS-power/ | 'partialAndNonCoherent' reported $n_{layer}^{PUSCH}$ | | | |
|---|---|---|---|---|
| | 1 | 2 | 3 | 4 |
| 00 | 0 | $10 \log_{10}(N_{PTRS})$ | $10 \log_{10}(N_{PTRS}) + 10 \log_{10}(n_{coherentlayer}^{PUSCH})$ | $10 \log_{10}(N_{PTRS}) + 10 \log_{10}(n_{coherentlayer}^{PUSCH})$ |
| 01 | 0 | 3 | 4.77 | 6 |
| 10 | | | reserved | |
| 11 | | | reserved | |

Here $n_{coherentlayer}^{PUSCH}$ is the number of coherent PUSCH layers whose corresponding DMRS ports share the same PTRS port.

The previous tables can be combined and represented by the following aggregate table, Table 7. This is similar to table 6.2.3.1-3 shown in 38.214 [NR; Physical layer procedures for data].

TABLE 7

| UL-PTRS-power/ $\alpha_{PTRS}^{PUSCH}$ | The number of PUSCH layers ($n_{layer}^{PUSCH}$) | | | | | | | |
|---|---|---|---|---|---|---|---|---|
| | 1 All cases | 2 Full coherent | 2 Partial and non-coherent | 3 Full coherent | 3 Partial coherent | 3 non-coherent | 4 Full coherent | 4 Partial coherent | 4 Non-coherent |
| 00 | 0 | 3 | $3Q_p-3$ | 4.77 | $10\log_{10}(N_{PRTS}) + 10\log_{10}(n_{coherentlay}^{PUSCH})$ | $3Q_p-3$ | 6 | $10\log_{10}(N_{PRTS}) + 10\log_{10}(n_{coherentlay}^{PUSCH})$ | $3Q_p-3$ |
| 01 | 0 | 3 | 3 | 4.77 | 4.77 | 4.77 | 6 | 6 | 6 |
| 10 | | | | | Reserved | | | | |
| 11 | | | | | Reserved | | | | | where $n_{layer}^{PUSCH}$ is the number of PUSCH layers where the corresponding DMRS ports share the same PT-RS port i, and $n_{coherenlayer}^{PUSCH}$ is the number of UL transmission layers which are coherent with each other and these UL layers contain the layer associated with the PTRS port.

In an alternative embodiment, the UE checks its own precoding matrix to identify the coherence of PUSCH layers. The UE then reports this to the gNB, which instructs the UE on the appropriate power boosting values based on table 6. Here, $n_{coherentlayer}^{PUSCH}$ can be estimated by the number of DMRS ports associated to the same SRS port.

Another approach to handle "partialAndNonCoherent" case is to assume non-coherent and thus power can only be borrowed from muted REs from another PTRS port. In such a case, the power boost factor can be represented as:

$$\rho_{PTRS,i} = -10\log_{10}(N_{PTRS}).$$

This is reflected in the following table, Table 8:

TABLE 8

| UL-PTRS-power/ | 'partialAndNonCoherent' reported $n_{layer}^{PUSCH}$ | | | |
|---|---|---|---|---|
| | 1 | 2 | 3 | 4 |
| 00 | 0 | $10\log_{10}(N_{PTRS})$ | $10\log_{10}(N_{PTRS})$ | $10\log_{10}(N_{PTRS})$ |
| 01 | 0 | 3 | 4.77 | 6 |
| 10 | | | reserved | |
| 11 | | | reserved | |

In another embodiment, instead of the gNB deciding on the power boosting, the UE is operable to determine and configure the power boosting independently of the gNB. In particular, the gNB might not have all necessary information, e.g., $n_{coherentlayer}^{PUSCH}$. In such cases, power boosting can be decided by the UE based on its own precoding matrix, from which UE can identify $n_{coherentlayer}^{PUSCH}$.

It should be noted that some or all of the embodiments of the disclosure may violate the agreement in RAN1 (the Radio layer definition in NR) that symbols with and without PTRS should have the same power in UL. As such, there are two alternative solutions:
  Scale the power of the symbol with PTRS including PTRS and PUSCH to the same level as the symbol without PTRS, e.g., $\hat{\rho}_{PTRS,i} = \beta \rho_{PTRS,i}$, where β is the scaling factor.
  Scale up the power of the symbol without PTRS including PUSCH to the same level as the symbol with PTRS and PUSCH. This can be performed in the UE, as required.

A possible issue of power shortage may arise where the PTRS symbol power is attempted to be boosted to a level higher than the maximum power level that the UE can support. In such a case, it is preferable to reduce the power of PUSCH in the same antenna port and use this 'spare' power to provide the power for the PTRS power boosting.

The UE can decide to choose either power scaling or the UE may puncture PUSCH and use the power from PUSCH to provide the power for boosting PTRS.

It should also be noted that multiple different implementations may be supported by selectively merging one or more of the tables presented in this application.

Throughout this application, reference has been made to the PTRS reference signal, but it should be noted that the same principles apply to other reference signals—such as CSI-RS, DMRS, SRS and TRS—in the NR specification and that these other reference signals may also benefit from power boosting according to embodiments of the disclosure.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the disclosure has been described with various embodiments, various changes and modifications may be suggested to one skilled in the art. It is intended that the disclosure encompass such changes and modifications as fall within the scope of the appended claims.

What is claimed is:

1. A method performed by a user equipment (UE) in a wireless communication system, the method comprising:
   identifying a power of at least one phase tracking reference signal (PT-RS) associated with a non-codebook-based transmission; and
   transmitting the at least one PT-RS,
   wherein the power of the at least one PT-RS is identified based on a value,
   wherein, in case that a number of PT-RS port is 1 and a number of physical uplink shared channel (PUSCH) layers is 1, the value is 0,
   wherein, in case that the number of PT-RS port is 1 and the number of PUSCH layers are 2, the value is 0,
   wherein, in case that the number of PT-RS port is 1 and the number of PUSCH layers are 3, the value is 0,
   wherein, in case that the number of PT-RS port is 1 and the number of PUSCH layers are 4, the value is 0,
   wherein, in case that the number of PT-RS ports are 2 and the number of PUSCH layers is 1, the value is 0,
   wherein, in case that the number of PT-RS ports are 2 and the number of PUSCH layers are 2, the value is 3,
   wherein, in case that the number of PT-RS ports are 2 and the number of PUSCH layers are 3, the value is 3, and
   wherein, in case that the number of PT-RS ports are 2 and the number of PUSCH layers are 4, the value is 3.

2. The method of claim 1, wherein the power is identified based on $3Q_p-3$, where the $Q_p$ is the number of PT-RS ports.

3. The method of claim 1, wherein the power is based on an equation:
   $\rho PTRS,i=-10 \log 10(NPTRS)$, wherein NPTRS comprises the number of PT-RS ports.

4. The method of claim 1, further comprising:
   performing power scaling is applied, if a power shortage occurs.

5. A user equipment (UE) in a wireless communication system, the UE comprising:
   a transceiver; and
   at least one processor coupled with the transceiver and configured to:
      identify a power of at least one phase tracking reference signal (PT-RS) associated with a non-codebook-based transmission, and
      transmit the at least one PT-RS,
   wherein the power of the at least one PT-RS is identified based on a value,
   wherein, in case that a number of PT-RS port is 1 and a number of physical uplink shared channel (PUSCH) layers is 1, the value is 0,
   wherein, in case that the number of PT-RS port is 1 and the number of PUSCH layers are 2, the value is 0,
   wherein, in case that the number of PT-RS port is 1 and the number of PUSCH layers are 3, the value is 0,
   wherein, in case that the number of PT-RS port is 1 and the number of PUSCH layers are 4, the value is 0,
   wherein, in case that the number of PT-RS ports are 2 and the number of PUSCH layers is 1, the value is 0,
   wherein, in case that the number of PT-RS ports are 2 and the number of PUSCH layers are 2, the value is 3,
   wherein, in case that the number of PT-RS ports are 2 and the number of PUSCH layers are 3, the value is 3, and
   wherein, in case that the number of PT-RS ports are 2 and the number of PUSCH layers are 4, the value is 3.

6. The UE of claim 5, wherein the power is identified based on $3Q_p-3$, where the $Q_p$ is the number of PT-RS ports.

7. The UE of claim 5, wherein the power is determined based on an equation:
   $\rho PTRS,i=-10 \log 10(NPTRS)$, wherein NPTRS comprises the number of PT-RS ports.

8. The UE of claim 5, wherein the at least one processor is further configured to perform power scaling is applied, if a power shortage occurs.

* * * * *